United States Patent
Erny et al.

(10) Patent No.: US 7,590,862 B2
(45) Date of Patent: Sep. 15, 2009

(54) METHOD OF DETECTING ILLICIT MODIFICATIONS OF MANUFACTURER SOFTWARE

(75) Inventors: Marie-Françoise Erny, Bailly (FR); Sébastien Breton, Colombes (FR)

(73) Assignee: Thales, Neuilly-sur-Seine (FR)

( * ) Notice: Subject to any disclaimer, the term of this patent is extended or adjusted under 35 U.S.C. 154(b) by 117 days.

(21) Appl. No.: 10/583,356

(22) PCT Filed: Dec. 15, 2004

(86) PCT No.: PCT/EP2004/053523

§ 371 (c)(1),
(2), (4) Date: May 24, 2007

(87) PCT Pub. No.: WO2005/069591

PCT Pub. Date: Jul. 28, 2005

(65) Prior Publication Data

US 2007/0226390 A1    Sep. 27, 2007

(30) Foreign Application Priority Data

Dec. 19, 2003   (FR) .................................. 03 15030

(51) Int. Cl.
*G06F 15/177* (2006.01)
*G06F 9/00* (2006.01)
*G06F 12/14* (2006.01)

(52) U.S. Cl. .............................. 713/187; 713/1; 713/2; 713/100

(58) Field of Classification Search ....................... None
See application file for complete search history.

(56) References Cited

U.S. PATENT DOCUMENTS

2003/0014663 A1   1/2003   Sormunen et al. ........... 713/200
2003/0229774 A1  12/2003   Freeman et al. ................. 713/1

*Primary Examiner*—Kaveh Abrishamkar
(74) *Attorney, Agent, or Firm*—Lowe Hauptman Ham & Berner, LLP

(57) ABSTRACT

Disclosed is a method making it possible to detect and/or to avoid illicit modifications of manufacturer software within a GSM type system. The GSM type system includes a hard kernel and a soft kernel, a local data interface. If the signal received on the local data interface of the terminal is not valid, then the GSM terminal is placed in a disabled state. If the signal is a disconnection signal on the local data interface, or there is no signal, a secure startup procedure is instigated with execution of the control functions. The hard kernel is auto tested. If the auto test is OK, then the integrity of the soft kernel is tested. If this integrity is OK, then the terminal is activated for normal operation. If the integrity is KO, then the terminal is placed in a disabled state. If the auto test is KO, then the GSM terminal is placed in a disabled state. If the received signal is a valid startup signal. Then if the fuse is not blown, the GSM terminal is rendered enabled. If the fuse is blown, the terminal is rendered not totally enabled, by deactivating at least one of the enabled functions of the terminal. If the signal is a signal of JTAG test type, the test procedure is continued. If the signal is a test signal, start up is in nonsecure mode and the test procedure is continued.

9 Claims, 3 Drawing Sheets

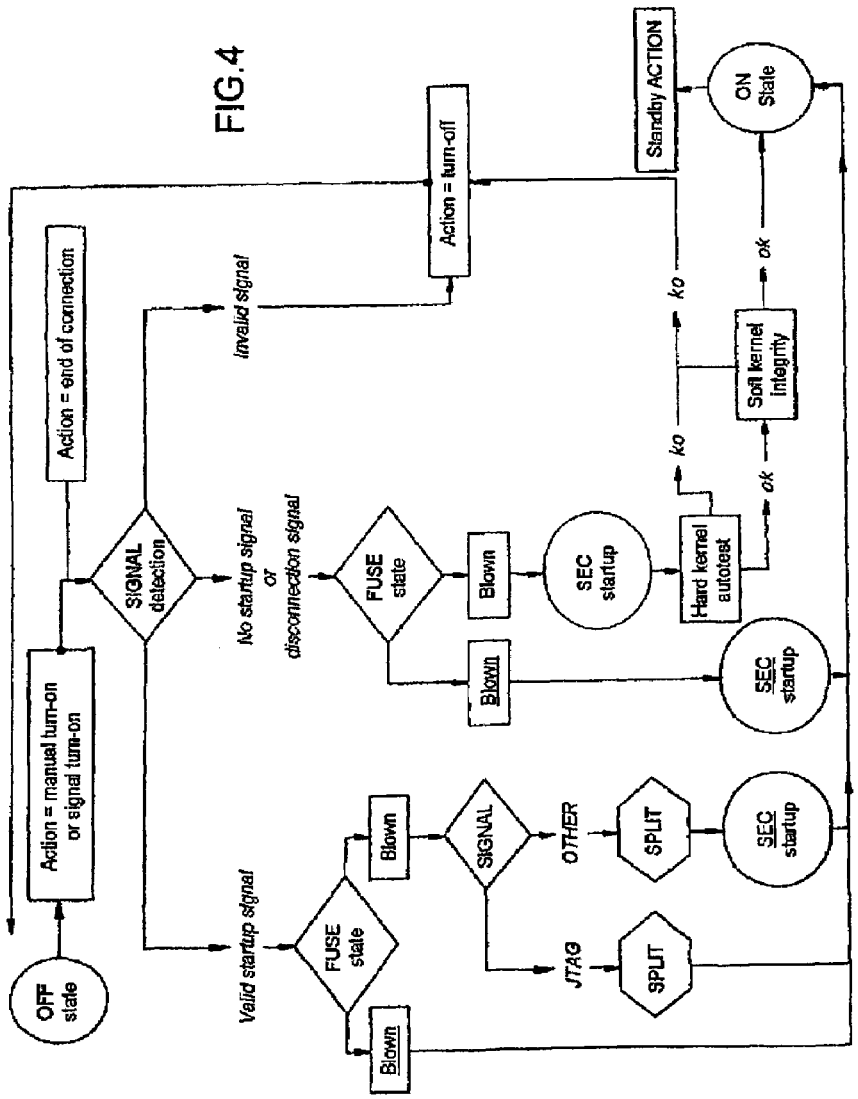

METHOD OF DETECTING ILLICIT MODIFICATIONS OF MANUFACTURER SOFTWARE

RELATED APPLICATIONS

The present application is based on, PCT/EP04/53523, filed Dec. 15, 2004 and claims priority from, France Application Number 03 15030, filed Dec. 19, 2003, the disclosure of which is hereby incorporated by reference herein in its entirety.

The Invention relates notably to a method making it possible to detect modifications and/or to avoid the modification of manufacturer software for GSM mobile (abbreviation of Global System Mobile), software embedded in a reprogrammable memory.

It also relates to any system comprising a hard kernel (nonmodifiable hardware occurring in the form of an ASIC for example) and a soft kernel (comprising programmable security functions), for example a PC-type computer comprising a nonreprogrammable ASIC and an operating system.

GSM mobile terminals are reprogrammable so as to make it possible to upgrade the software versions of the services offered to users. Currently, access to the reprogramming functions is not sufficiently secure and certain users easily succeed in performing software modifications so as to override the security functions integrated by manufacturers. Therefore, they falsify the operation of the terminals so as to access additional services 0or functions or to reuse stolen terminals.

Current means of protection against Illicit software modifications are inadequate. Hackers fairly rapidly succeed in finding the addresses of the programmable memories to be modified, so as to neutralize or sidestep the security mechanisms put in place by manufacturers. The objective of "hackers" is to permit, without payment, access to the potentially available additional services and to override the access controls.

The modifications are achievable via multiple channels (UART or Universal Asynchronous Receiver/Transmitter, USB or Universal Serial Bus, JTAG or Joint Test Action Group, etc.) or by direct modification on the reprogrammable memory or FEPROM (Flash Erasable Programmable Read Only Memory), by hardware Integrity attack by desoldering—resoldering, for example.

The current mode of startup of a GSM terminal in autoconfiguration mode, by detection of specific signals, is a weak mechanism which does not offer solid protection.

The invention relates to a method making it possible to detect and/or to avoid the modification of software embedded in a programmable memory within a system comprising a hard kernel containing hardware security functions suitable for verifying the integrity in particular of a soft kernel comprising a programmable memory, the system comprising a local data interface. It is characterized in that it comprises at least the following steps:

A1—the signal received on the local data interface is not valid, place the system in a disabled state, B1—the received signal is a disconnection signal on the local data interface, or there is no signal, instigate a secure startup procedure, with execution of the control functions, Auto-test of the hard kernel:
  If the auto test is OK, then test the integrity of the reprogrammable memory,
    If this integrity is OK, then activate the system for normal operation
    If this integrity is KO, then place the system in a disabled state
  If the auto test is KO, then place the system in a disabled state, C1—the received signal is a valid startup signal,
  If the system is in a development mode, render it enabled,
  If the system is in an enabled utilization mode and if the signal is a test signal, then deactivate at least one of the essential functions of enabled operation.

The invention also relates to a method making it possible to detect and/or to avoid illicit modifications of manufacturer software within a GSM-type system, comprising a hard kernel and a soft kernel, a local data interface, characterized in that it comprises at least the following steps:

A2—the signal received on the local data Interface of the terminal is not valid, place the GSM terminal in a disabled state, B2—the signal is a disconnection signal on the local data interface or there is no signal, instigate a secure startup procedure, with execution of the control functions:

Auto test of the hard kernel
  If the auto test is OK, then test the integrity of the soft kernel
    If this integrity is OK, then activate the terminal for normal operation,
    If the integrity is KO, then place the terminal in a disabled state,
  If the auto test is KO, then place the GSM terminal in a disabled state.

C2—the received signal is a valid startup signal:
  If the fuse is not blown, render the GSM terminal enabled,
  If the fuse is blown, render the terminal not totally enabled, by deactivating at least one of the enabled functions of the terminal:
    If the signal is a signal of JTAG test type, continue the test procedure,
    If the signal is a test signal, start up in nonsecure mode and continue the test procedure.

The exchange of the data between the hard kernel and the soft kernel is for example performed by using an algorithm based on the principle of non-replay and of nonpredictability of the transmitted data.

The invention also relates to a system making it possible to detect and/or to avoid the modification of software embedded in a programmable memory comprising a hard kernel containing hardware security functions and a soft kernel comprising a programmable memory, a local data interface able to receive signals. It is characterized in that it comprises means suitable to:

place the system In a disabled state when the signal received on a local data interface is not valid, for a disconnection signal received or absence of signal on a local data interface, instigate a secure startup procedure, with execution of control functions:

Auto test of the hard kernel:
  If the auto test is OK, then test the integrity of the programmable memory,
    If this integrity is OK, then activate the system for normal operation
    If this integrity is KO, then place the system in a disabled state
  If the auto test is KO, then place the system In a disabled state, For a received signal is a valid startup signal,
  If the system is in a development mode, render it enabled If the system is in an enabled utilization mode, and if the signal is a test signal then deactivate one of the essential functions of enabled operation on startup.

The system can comprise means of securing the data exchanges between the hard kernel and the soft kernel.

The system can be a GSM terminal or a PC-type microcomputer or an MP3-type reader containing a reprogrammable memory.

The method according to the invention presents in particular the following advantages. It takes account of the Industrial process of production, of commercialization and of maintenance. The adaptation of the principles of integrity (in the authenticity sense: origin and integrity), of the reprogrammable software and data is distributed over hardware devices integrated within an ASIC guaranteeing non-modification of the control mechanisms, associated with software security devices adaptable to the various software versions of GSM terminals for example.

BRIEF DESCRIPTION OF THE DRAWING

Other characteristics and advantages of the invention will be more apparent on reading the description of an example given by way of wholly nonlimiting illustration together with appended figures which represent.

SUMMARY OF THE INVENTION

Figure 1:
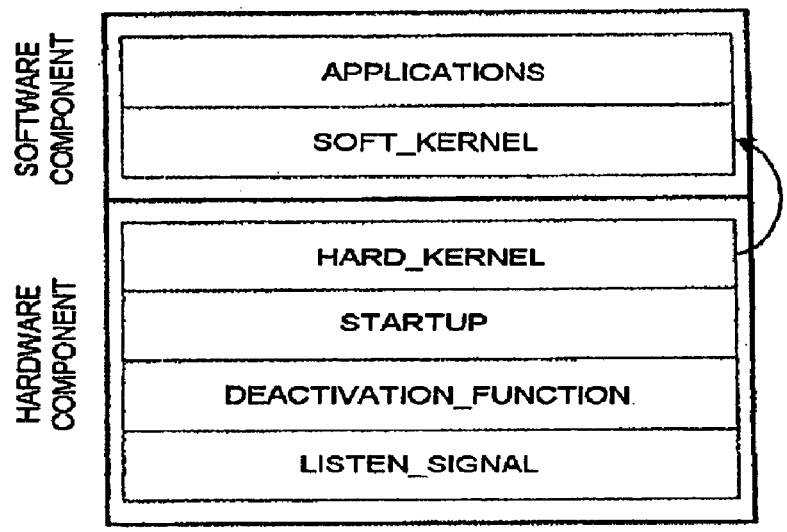
FIG. 1 the functional components of a GSM mobile terminal having an impact on access security, FIG. 2 the structure of the FEPROM, FIG. 3 three security levels considered during the startup of the GSM, FIG. 4 a diagram of the logic of the assembly, FIG. 5 an example of secure exchanges between components of the GSM terminal without shared secret.

In order to better elucidate the principle of the method according to the invention, the example which follows is given for a GSM system whose architecture is recalled in FIG. 1.

This FIG. 1 represents the functional architecture of a GSM terminal structured as several modules. Only the modules having an Impact on security are represented in this figure and are taken into account for the description. We distinguish a hardware component comprising the hard kernel and a software component comprising the soft kernel. The hard kernel corresponds to the hardware security functions which make it possible to verify the integrity of the terminal during normal startup or to disable the GSM terminal in any other mode of operation. The soft kernel integrates the software security functions which ensure the security of the code loaded into FEPROM. The soft kernel is signed off line by a secret key, and its signature is verified during NORMAL startup by the hard kernel. Should it be noted that the integrity of the GSM terminal is compromised (loss of the integrity of the soft kernel), the terminal becomes disabled for any startup mode until a new intact soft kernel is downloaded into the terminal.

The two modules taken into account subsequently in the description are:

the hardware component comprising:
The LISTEN_SIGNAL module;
The DEACTIVATION_FUNCTION module;
The STARTUP module;
The HARD_KERNEL module or hardware security module.

the software component comprising:
The SOFT_KERNEL module; or software security module;
The APPLICATIONS module.

The APPLICATIONS module of the software component is partially secure. It depends tightly on the security policy chosen by the manufacturer.

These two components are detailed subsequently in the description.

The description adopts the following terminology:
VAR: a nonunderlined variable or state conveys its ACTIVE nature;
VAR: an underlined variable or state conveys a NEGATION of its ACTIVE nature.

Hardware component

HARD_KERNEL

The hard kernel contains the hardware security mechanisms which make it possible to verify its proper operation and the integrity of the soft kernel and the mechanisms which make it possible to define the security policy to be applied as a function of the startup mode (JTAG, OTHER, NORMAL), and the phase of operation of the terminal, ASIC with blown or unblown bit.

In view of security, the functionalities covered by the various modules of the hardware component are implemented as two versions of components:

The FUSE NOT BLOWN Component (no activation of security mechanisms) which uses the following modules:
LISTEN_SIGNAL
FUSE
STARTUP nonsecure The FUSE BLOWN Component which comprises two modes of operation according to the detection or non-detection of a signal on startup of the terminal (LISTEN SIGNAL Module) (signal observed at the level of the local data interface of the GSM terminal)

Absence of signal: secure startup mode (the terminal is enabled)
LISTEN_SIGNAL
FUSE
STARTUP (SECURE)

Reception of a signal at the level of the local data interface of the GSM terminal: activation of the SPLIT function (inhibiting of an essential function rendering the terminal disabled)
LISTEN_SIGNAL
FUSE
DEACTIVATION_FUNCTION (or SPLIT)
STARTUP (NON-SECURE)

LISTEN_SIGNAL module

This module makes it possible to know the type of signal received at the level of the local data interface of the GSM terminal. It can involve a signal of type:

JTAG: test startup mode where the system instigation component or BOOT is not woken up, the security part is hence not activated, NORMAL: nominal mode of operation (no signal received on startup of the terminal) where the security is systematically activated when the bit is blown, RESTART: reinitialization of the system in a stable state before cold restart with predefined parameters, OTHER: startup mode corresponding to various TEST modes where the BOOT component is woken up but the security part is not activated.

The reception of a signal on the local data interface of the GSM terminal must lead to the terminal being systematically toggled into a disabled mode if the fuse is blown, with deactivation of the keyboard, of the sound or of an essential function for example.

DEACTIVATION_FUNCTION MODULE (or SPLIT)

This module makes it possible to render the terminal disabled by deactivating a function essential for the operation of the GSM terminal, for example the keyboard, the sound or other. This module is called the SPLIT MODULE for the sake of simplification of the figures.

FUSE MODULE

This module makes it possible to test the state of the fuse which corresponds:

UNBLOWN, to the pre-sale development mode (development, debugging, etc), with the use of the ASIC version comprising an unblown fuse.

BLOWN to the mode of utilization of the GSM terminal, after placement in the sales circuit, with the use of the ASIC version comprising a blown fuse.

STARTUP MODULE

This module has in particular the function of activating the security policy as a function of the type of startup invoked and makes it possible to apply the security policy according to the state of the fuse and the presence or absence of a signal.

PILOT MODULES

This module makes it possible to load the FLASH pilots, for management of the I/Os, so as to read, write and execute in FEPROM. The LISTEN SIGNAL and FUSE_BLOWN Hardware modules are buried in the ASIC component, it is not possible to listen to or intercept the streams exchanged between the two components.

Software Component

Figure 2:
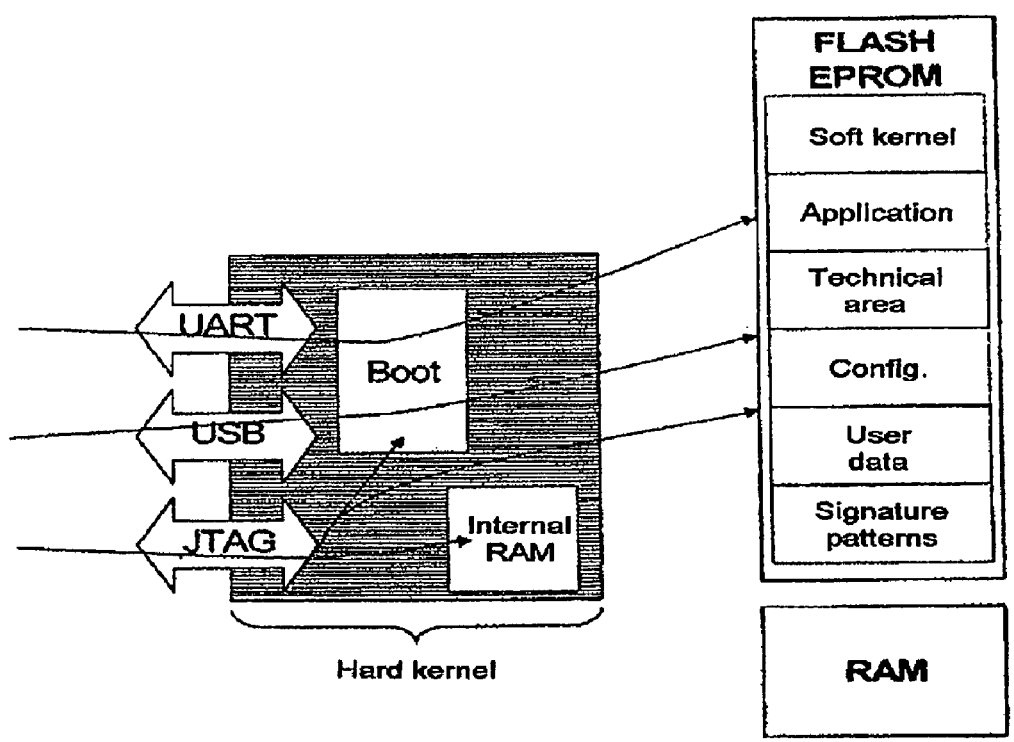

FIG. 2 represents the structure of the FEPROM (abbreviation of Flash Programmable Read Only Memory) and its interaction with the hard kernel.

Soft Kernel Module

The soft kernel is a application overlay which ensures in particular the security of the applications and of the sensitive data referenced in the list of sensitive elements to be protected. The security mechanisms of the soft kernel are implemented at the level of the FEPROM after execution of the hard kernel.

The modification of the soft kernel requires a phase of downloading of a new signed soft kernel so that the latter is recognized as valid at the level of the hard kernel.

APPLICATIONS MODULE

This module can employ security mechanisms, distributed in the whole code contained in FEPROM, whose main objective is to detect any unscheduled modification of the integrity of the monitored sensitive code. The security mechanisms of this module are specific to the manufacturer functions integrated into the FEPROM.

The idea of the invention relies in particular on the control of the downloading of software into the FEPROM. This securing is based on control of authenticity and of integrity of the software to be downloaded.

For this purpose, the method takes into account the complete life cycle of the terminals. This life cycle corresponds to the hardware and software development phases, integration, tests, validation, commissioning, utilization, investigatory tests in the event of malfunction, return for maintenance with possibility of performing direct modifications of the software code or patches, so as to make it possible to test and to validate the error corrections or the integration of upgrades.

A part of the mechanisms proposed in the method according to the invention is based on the use of signature mechanisms using a Hash and asymmetric encryption algorithm. This makes it possible in particular not to be constrained by the unforeseen disclosure of secret information. Specifically, only the signatory possesses the secret key, the key allowing the authenticity and integrity controls is a public key.

This signature operation is performed, for example, after validation of the software on a dedicated station before dissemination of the software to be downloaded. Only this station will know the secret signature key. This station will also have the capacity to generate the asymmetric key pairs in the event that renewal of the keys is required.

The method according to the invention relates to the hardware security mechanisms taken into consideration when designing the mobile terminal and also the security mechanisms to be added at the level of the software layer of the terminal.

Hereinafter in the description two modes of operation are involved:

The NORMAL Mode: this mode makes it possible to activate the startup procedures for the ASIC of the GSM terminal and to render the GSM terminal enabled, The TEST Mode: this mode makes it possible potentially to override the ASIC startup procedures (for example by using the JTAG interface) and to read and/or to write directly in FEPROM.

Two operating states are envisaged for the commissioning of the security mechanisms according to the state of the fuse described hereafter. The state of the fuse corresponds to a specific ASIC version.

Figure 3:
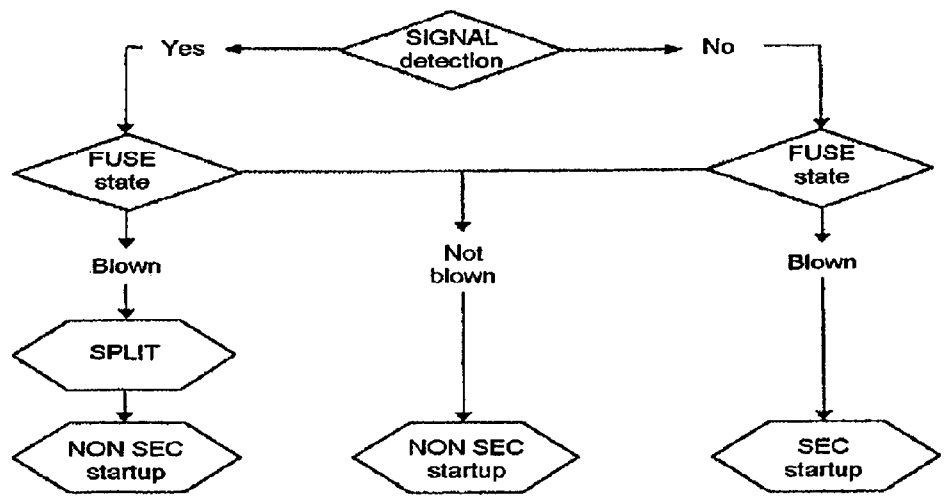

FIG. 3 shows diagrammatically various security levels which will be detailed in FIG. 4 of the overall logic diagram.

Three cases are to be considered during startup of the terminal, FIG. 3:

Fuse not blown, with or without signal

This case relates to any type of startup with or without signal once the fuse is blown; the security mechanisms are not activated Signal and Fuse blown This case implements the activation of the SPLIT function No signal and Fuse blown Startup is secure No signal and fuse not blown Startup is not secure FIG. 4 details the various steps implemented by the method according to the invention.

The GSM terminal being in an off state, the method verifies whether it receives a signal on the local data interface (external signal as opposed to the customary GSM turn-on).

A2—In the case where the received signal is not valid, then the method toggles the GSM terminal into a disabled state (action=turn-off).

B2—In the case where the GSM terminal does not receive any signal or receives a disconnection signal on the local data Interface, we are in the NORMAL mode→turn-on in normal utilization mode. The method then instigates the secure startup procedure (all the integrated security procedures are activated normally, in the event of noted attack of loss of integrity of the system, the terminal is no longer enabled).

After turn-on, the method thereafter executes the control functions:

Auto test of the hard kernel:
    If the auto test is OK, then the integrity of the soft kernel is tested
        If this integrity is OK, then the terminal can be activated for normal operation,
        If the integrity is KO, then the GSM system is placed in disabled state.
    In this mode, the terminal is able to detect an intrusion and hence to react to any modification of the sensitive areas. In the case of the detection of loss of integrity of the soft kernel, the GSM terminal executes the envisaged defense functions.
    If the auto test of the hard kernel is KO, then the GSM terminal is placed In a disabled state.

C2—In the case where the GSM terminal receives a valid startup signal, the method executes the following steps:
    The fuse is not blown, Auto-configuration NOT BLOWN, no security function is implemented, the system is rendered enabled (on state, action standby).
    The fuse is blown, Auto-configuration BLOWN, the terminal is rendered not totally enabled by using a SPLIT function, so
        If the signal is a JTAG signal, the keyboard or the screen is deactivated before continuing the test procedure,
        If the signal is another valid test signal, the keyboard or the screen is deactivated and a nonsecure startup procedure is instigated before continuing the test procedure.

These two complementary and disjoint deactivation modes make it possible in particular to conduct all the test scenarios without the terminal being completely enabled.

It is possible, for example, to define a deactivation mode where a user interface would be offloaded from the GSM terminal.

For example, for a keyboard interface:
    Test mode 1: the terminal is enabled but the keyboard is inactive. This mode requires the addition of a keyboard offloaded to the test machine.
    Test mode 2: the keyboard is enabled—the radio pathway or any other function is inactive.

Figure 5:
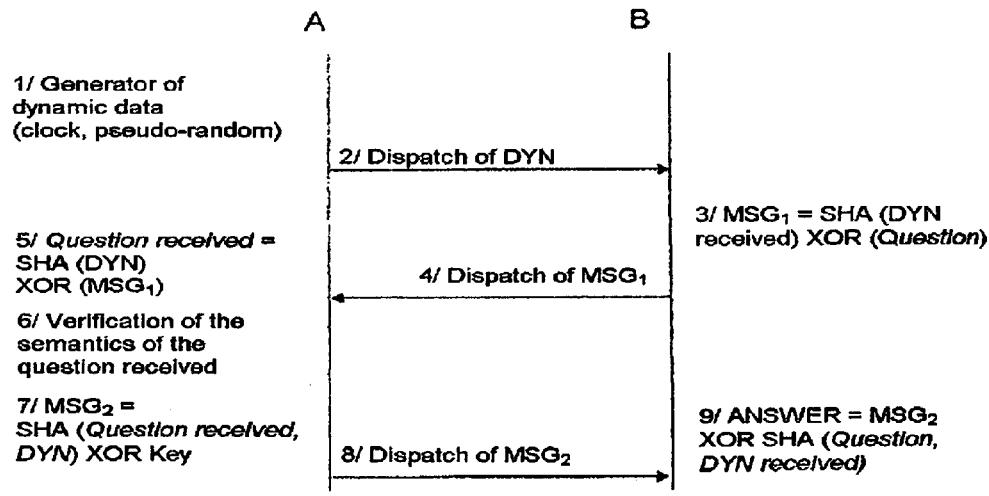

FIG. 5 shows diagrammatically the principles of securing of the message exchanges between the modules of the GSM terminal.

The securing of the data exchanges is for example based on the principles of non-replay of the transmitted data and of nonpredictability of the dynamic data.

It can be conceivable to implement one or the other of the mechanisms at the level of the GSM terminal. The addition of a dynamic data item (temporal value or pseudo-random) to render the exchanges of messages dynamic so as to limit any attempt to replay an intercepted stream or to use pirated software.

Component A can be the ASIC (where the HARD KERNEL is) and component B can be the FEEPROM (where the SOFT KERNEL is). The exchanges between A and B are then protected by the process described in FIG. 5. SHA represents a "hash" function, XOR corresponds to an "exclusive or" operation, DYN corresponds to a random string.

The messages exchanged are for example the following:
1/ Generator of dynamic data (clock, pseudo-random)->DYN From the ASIC A to the FEPROM
2/ Dispatch of DYN
3/ $MSG_1$=SHA(DYN received) XOR (Question) from the FEPROM B to the ASIC A
4/ Dispatch of $MSG_1$
5/ Question received=SHA(DYN) XOR($MSG_1$)
6/ Verification of the semantics of the question received
7/ $MSG_2$=SHA(Question received, DYIN) XOR ANSWER from the ASIC A to the FEPROM B
8/ Dispatch of $MSG_2$
9/ ANSWER_RECEIVED=$MSG_2$ XOR SHA(Question, DYN received)

Without departing from the scope of the invention, the method also applies for detecting and/or avoiding illicit modifications within a PC type system, comprising an ASIC (non-modifiable hardware) and a memory space comprising a software layer to be protected.

The method also applies in an MP3 type reader containing a reprogrammable memory, such as MP3 readers of USB key type.

The invention claimed is:

1. A method to detect and/or to avoid the modification of software embedded in a programmable memory within a system comprising a hard kernel containing hardware security functions suitable for verifying the integrity of a soft kernel comprising a programmable memory, the system comprising a local data interface, comprising the following steps:
    placing the system in a disabled state if a signal received on the local data interface is invalid;
    instigating a secure startup procedure, with execution of the control functions if the signal received on the local data interface is a disconnection signal, or there is no signal;
    auto testing of the hard kernel wherein:
if the auto test is OK, then test the integrity of the reprogrammable memory;
    if this integrity is OK, then activate the system for normal operation;
    if this integrity is OK, then place the system in a disabled state;
if the auto test is OK, then place the system in a disabled state; wherein if the received signal is a valid startup signal;
if the system is in a development mode, render it enabled;
    if the system is in an enabled utilization mode and if the signal is a test signal, then deactivate at least one of the essential functions of enabled operation.

2. A method to detect and/or to avoid illicit modifications of manufacturer software within a GSM-type system, comprising a hard kernel and a soft kernel, a local data interface, comprising at least the following steps:
    placing the GSM terminal in a disabled state, if a signal received on the local data interface of the terminal is invalid;
    instigating a secure startup procedure, with execution of the control functions if the signal received on the local data interface is a disconnection signal, or there is no signal:
    auto testing of the hard kernel wherein:
if the auto test is OK, then test the integrity of the soft kernel;
    if this integrity is OK, then activate the terminal for normal operation;
if the integrity is OK, then place the terminal in a disabled state;
if the auto test is OK, then place the GSM terminal in a disabled state;

wherein if the received signal is a valid startup signal;
if a fuse is not blown, render the GSM terminal enabled;
if the fuse is blown, render the terminal not totally enabled, by deactivating at least one of the enabled functions of the terminal;
if the signal is a signal of JTAG test type, continue the test procedure,
if the signal is a test signal, start up in nonsecure mode and continue the test procedure.

3. The method according to claim 1, wherein the exchange of the data between the hard kernel and the soft kernel is performed by using an algorithm based on the principle of non-replay and of nonpredictability of the transmitted data.

4. The system making it possible to detect and/or to avoid the modification of software embedded in a programmable memory comprising a hard kernel containing hardware security functions and a soft kernel comprising a programmable memory, a local data interface able to receive signals, comprising means suitable to:
placing the system in a disabled state when a signal received on the local data interface is invalid;
for a disconnection signal received or an absence of signal on the local data interface, instigating a secure startup procedure, with execution of control functions:
auto testing of the hard kernel wherein:
if the auto test is OK, then test the integrity of the programmable memory;
if this integrity is OK, then activate the system for normal operation;
if this integrity is OK, then place the system in a disabled state;
if the auto test is OK, then place the system in a disabled state;
for a received signal is a valid startup signal;
if the system is in a development mode, render it enabled;
if the system is in an enabled utilization mode, and if the signal is a test signal then deactivate at least one of the essential functions of enabled operation on startup.

5. The system according to claim 4, comprising means of securing the data exchanges between the hard kernel and the soft kernel.

6. The system according to claim 4, wherein the system is a GSM terminal.

7. The system according to claim 4, wherein the system is a micro-computer.

8. The system according to claim 4, wherein the system is an MP3-type reader containing a reprogrammable memory.

9. The method according to claim 2, wherein the exchange of the data between the hard kernel and the soft kernel is performed by using an algorithm based on the principle of non-replay and of nonpredictability of the transmitted data.

* * * * *